United States Patent Office 2,875,249
Patented Feb. 24, 1959

2,875,249
NEW PREPARATION OF 2,5-DIMETHYLCYCLO-PENTANONE

Harry A. Stansbury, Jr., South Charleston, and Howard R. Guest, Charleston, W. Va., assignors to Union Carbide Corporation, a corporation of New York No Drawing. Application February 28, 1957
Serial No. 642,944

13 Claims. (Cl. 260—586)

The present invention relates to the preparation of 2,5-dimethylcyclopentanone. More particularly this invention concerns the preparation of 2,5-dimethylcyclopentanone by the decarbonylation of certain aldehydes.

According to heretofore customary procedures it was known to prepare this cyclic ketone by heating 2,5-dimethyladipic acid with calcium hydroxide. Another known method has proposed the hydrolytic reaction of 2-carbethoxy-5-cyano-2,5-dimethylcyclopentanone in the presence of sulfuric acid. According to still another known method diethyl 2-methyl-adipate is treated with sodium ethylate. The resultant product, ethyl 3-methyl-2-oxocyclopentane-1-carboxylate, is then converted in the presence of methyl iodide with subsequent acid hydrolysis and decarboxylation to 2,5-dimethylcyclopentanone.

These foregoing syntheses, however, employ starting materials which are not normally available commercially and hence are not economically feasible.

Accordingly, our invention is based on the discovery that 2,5-dimethylcyclopentanone can be prepared by forming a mixture of methacrolein dimer (2,3-dihydro-2,5-dimethyl-2-formyl-1,4-pyran) or 2,5-dimethyl-2-hydroxyadipaldehyde with an aqueous mineral acid catalyst such as, for example, hydrochloric acid, phosphoric acid or sulfuric acid and heating said mixture. A less preferred class of catalysts are acid treated clays such as "Super-filtrol" wherein aqueous mineral acid e. g. hydrochloric acid is absorbed. The preferred temperature range for obtaining the most efficient yield of 2,5-dimethylcyclopentanone is from 110° C. to 125° C. However, temperatures from 80° C. to 180° C. are wholly operative. No advantage is seen in employing temperatures substantially below 80° C. since the rate of reaction is then markedly decreased. The reaction can take place, optionally, at atmospheric pressure or in a closed system under reduced or elevated pressures.

The reaction time is not narrowly critical. However, to obtain an optimum yield a period of two to eight hours is preferred. Conversion is usually substantially complete at the end of eight hours. While periods of one hour or less are wholly operative a decreased yield of the desired cyclic ketone is then generally obtained.

The reaction mix is preferably distilled and an oily, non-aqueous, water-insoluble layer containing the major portion of 2,5-dimethylcyclopentanone initially removed. The aqueous layer can be extracted to remove traces of 2,5-dimethylcyclopentanone, which is slightly soluble therein. Suitable solvents are those which are substantially immiscible with water, do not boil within boiling ranges of 2,5-dimethylcyclopentanone and methacrolein dimer, and are separable from the product ketone by fractionation. Illustrative of these solvents are diethyl ether, diisopropyl ether, di-(2-chloroethyl)ether, petroleum ether, benzene, toluene, hexane, heptane and isopropyl acetate. The proportion of solvent present relative to the other components of the reaction mix is not critical. Water is initially charged to the reaction mix or added during the course of the distillation preferably.

It should be noted that the amount of catalyst employed can be varied considerably without adversely affecting the reaction. Generally, the preferred range of acid catalyst present is in the range of 1 to 6 times by weight of the amount of methacrolein dimer employed in the reaction mix. The concentration of catalyst by weight of water will vary desirably with the particular mineral acid employed. Thus, for example, where hydrochloric acid is utilized as the catalyst, the concentration of acid by weight of water employed will vary from 20 percent, when the reaction is carried on at atmospheric pressure, to about 80 percent where pressures greater than atmospheric are used. A concentration of 20 percent is employed at atmospheric pressure since within the temperature range desirably employed herein, i. e., 80° C. to 160° C. which is the strength of the constant boiling mixture of hydrogen chloride and water. Where phosphoric acid is the catalyst used, concentrations in the range of 65 percent to 80 percent are preferred, while in those instances where sulfuric acid is introduced as the catalyst a concentration of 40 percent to 55 percent is deemed most appropriate.

The present invention, comprising the decarbonylation of commercially available methacrolein dimer as well as 2,5-dimethyl-2-hydroxyadipaldehyde, the hydrolysis of methacrolein dimer, can be illustrated graphically by the following equations:

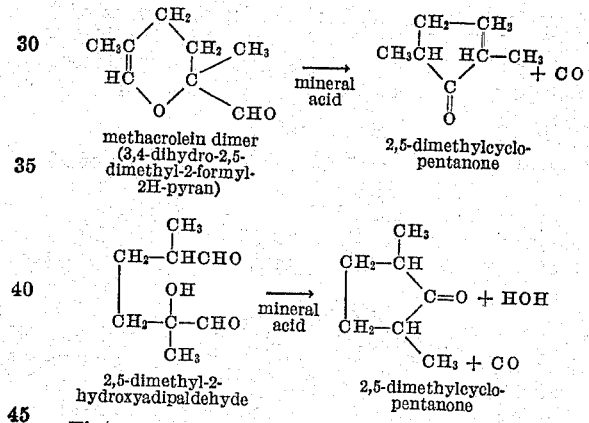

The preparation of 2,5-dimethyl-2-hydroxyadipaldehyde by the acid hydrolysis of methacrolein dimer, is disclosed in United States Patent 2,694,077.

The cyclic ketone of the present invention is of particular utility as a solvent for "Vinylite" resins, such as Bakelite VYHH a copolymer composed of 87 percent by weight vinyl chloride and 13 percent by weight vinyl acetate, having an intrinsic viscosity of 0.53 measured in cyclohexanone at 20° C. and a specific gravity of 1.36, and Bakelite VYNW, a copolymer composed of 96 percent by weight vinyl chloride, and 4 percent by weight vinyl acetate, having an intrinsic viscosity measured in cyclohexanone at 20° C. of 1.25 and a specific gravity of 1.39.

The following examples further illustrate our invention:

Example 1

A mixture of 872 grams (g.) of 20 percent (%) hydrochloric acid and 280 grams of methacrolein dimer (2 moles) was distilled at atmospheric pressure without reflux until no more oil was in the distillate. During the distillation (which required 130 minutes) the kettle temperature increased from 110° C. to 115° C. and the head temperature increased from 100° C. to 108° C. The distillate contained 89 grams of oil layer and 729 grams of water layer. The aqueous solution was extracted twice with 100 cc. portions of isopropyl ether. The extracts and oil were combined and distilled to obtain a yield of 2,5-dimethylcyclopentanone of 43 percent based on the number of moles of methacrolein dimer starting material and 46 percent efficiency.

*Example 2*

Six hundred grams of 50 percent sulfuric acid were placed into a suitable kettle and distilled at atmospheric pressure for a period of 1.2 hours. During this time, 280 grams of methacrolein dimer (2 moles) and 375 cc. of water were fed simultaneously and continuously to the kettle. The distillation was continued for 2.8 hours longer, while an additional amount of 825 cc. of water was fed. The kettle temperature was 111° C.–123° C. during the reaction. The distillate collected in two layers, the oil layer weighing 118 grams at the end of the run. After extracting the aqueous layer with 100 cc. of isopropyl ether, the oil layer and the extract were combined and distilled to obtain 2,5-dimethylcyclopentanone, which was recovered at a yield of 44 percent based on the number of moles of methacrolein dimer starting material and an efficiency of 49 percent.

*Example 3*

Example 2 was repeated substituting 600 grams of 17 percent sulfuric acid employed therein. The yield of 2,5-dimethylcyclopentanone was 23 percent based on the total number of moles of starting material for an efficiency of 30 percent.

*Example 4*

Example 2 was repeated substituting 600 grams of 8 percent sulfuric acid for the 50 percent sulfuric acid employed therein. The yield of 2,5-dimethylcyclopentanone was 10 percent with an efficiency of 12 percent.

*Example 5*

Example 2 was repeated substituting 600 grams of 50 percent phosphoric acid for the 50 percent sulfuric acid employed therein. The yield of 2,5-dimethylcyclopentanone was 17 percent, while the efficiency was 22 percent based on methacrolein dimer.

*Example 6*

While 600 grams of 75 percent phosphoric acid were distilled under a reduced pressure of 280 mm. (to maintain a kettle temperature of about 120° C.), 280 grams of methacrolein dimer (2 moles) and water were fed so as to maintain a constant kettle volume. The dimer was fed over a period of 2.5 hours and the distillation was continued for 20 minutes longer, at which point no more oil was in the condensate. The oil layer (157 grams) was separated from the aqueous layer (799 grams) of the distillate. The aqueous layer was extracted with 200 cc. of heptane. The oil and extract were combined and distilled to obtain 2,5-dimethylcyclopentanone in 31 percent yield based on the number of moles of methacrolein dimer and 44 percent efficiency.

*Example 7*

Methacrolein dimer was stirred and refluxed for eight hours at 140° C.–163° C. while using as catalyst 5 percent by weight of the total composition of "Superfiltrol," a commercially-offered, acid-treated clay supplied by Filtrol Corporation. Upon filtering and distilling the reaction mixture, 2,5-dimethylcyclopentanone was obtained at a yield and efficiency of approximately 10 percent.

The experiment demonstrates that mineral acids may be replaced in this process by solid, carrier-bound mineral acids, such as acid-treated clays and the like.

*Example 8*

Using identical equipment as in Example 2, 600 grams of 50 percent sulfuric acid were distilled at atmospheric pressure for a period of 65 minutes. During that time, 158 grams of 2,5-dimethyl-2-hydroxyadipaldehyde (1 mol) and 140 cc. of water were fed simultaneously and continuously to the kettle. The distillation was continued for another hour, during which an additional 160 cc. of water were fed. The kettle temperature during the reaction was 125° C.–128° C. The distillate (515 cc.) contained 69 grams of oil, which was separated from the aqueous layer. After extracting the latter with 50 cc. of isopropyl ether, the oil layer and the extract were combined and distilled to obtain 2,5-dimethylcyclopentanone, which was recovered at a 70 percent yield and efficiency based on the number of moles of 2,5-dimethyl-2-hydroxyadipaldehyde.

Upon analyzing a typical sample 2,5-dimethycyclopentanone, produced by means of the herein disclosed method, the following results were obtained: B. P. 64°–67° C./50 mm. Hg; sp. gr. 0.898/20° C.; N 30/D 1.4250; purity 106 percent by hydroxylamine analysis; C 74.2 percent (thetoretical 75.0 percent); H 10.9 percent (theoretical 10.7 percent); unsaturation by analytical bromination—none; esters by analytical saponification—none. Infrared adsorption studies indicated the presence of ketone and methyl groups and the absence of aldehyde, ether, hydroxyl and unsaturation. The product was identified as 2,5-dimethylcyclopentanone by conversion into its semicarbazone, previously known, having a M. P. of 195° C.–196° C. and an N-content of 25.0 percent (Dumas) (theoretical 24.9 percent).

What is claimed is:

1. A process which comprises forming a mixture of a mineral acid of a minimum concentration of eight percent and a member selected from the group consisting of 3,4 - dihydro - 2,5 - dimethyl - 2 - formyl - 2H - pyran and 2,5 - dimethyl - 2 - hydroxyadipaldehyde and heating said mixture to cause the formation of 2,5-dimethylcyclopentanone.

2. A process which comprises forming a mixture of an aqueous mineral acid of a minimum concentration of eight percent selected from the group consisting of sulfuric acid, phosphoric acid and hydrochloric acid and a member consisting of 3,4 - dihydro - 2,5 - dimethyl - 2 - formyl - 2H - pyran and 2,5 - dimethyl - 2 - hydroxyadipaldehyde and heating said mixture at a temperature of 80° C. to 180° C. to cause the formation of 2,5-dimethylcyclopentanone.

3. A process which comprises forming a mixture of 3,4 - dihydro - 2,5 - dimethyl - 2 - formyl - 2H - pyran and an aqueous mineral acid of a minimum concentration of eight percent selected from the group consisting of sulfuric acid, phosphoric acid and hydrochloric acid and heating said mixture at a temperature of 80° C. to 180° C. to cause the formation of 2,5-dimethylcyclopentanone.

4. A process which comprises forming a mixture of 2,5 - dimethyl - 2 - hydroxyadipaldehyde and an aqueous mineral acid of a minimum concentration of eight percent selected from the group consisting of sulfuric acid, phosphoric and hydrochloric acid and heating said mixture at a temperature of 80° C. to 180° C. to cause the formation of 2,5-dimethylcyclopentanone.

5. A process which comprises forming a mixture of aqueous sulfuric acid of a minimum concentration of eight percent and a member selected from the group consisting of 3,4 - dihydro - 2,5 - dimethyl - 2 - formyl - 2H - pyran and 2,5 - dimethyl - 2 - hydroxyadipaldehyde and heating said mixture at a temperature of 80° C. to 180° C. to cause the formation of 2,5-dimethylcyclopentanone.

6. A process which comprises forming a mixture of aqueous phosphoric acid of a minimum concentration of eight percent and a member selected from the group consisting of 3,4 - dihydro - 2,5 - dimethyl - 2 - formyl - 2H - pyran and 2,5 - dimethyl - 2 - hydroxyadipaldehyde and heating said mixture at a temperature of 80° C. to 180° C. to cause the formation of 2,5-dimethylcyclopentanone.

7. A process which comprises forming a mixture of aqueous hydrochloric acid of a minimum concentration of eight percent and a member selected from the group consisting of 3,4 - dihydro - 2,5 - dimethyl - 2 - formyl - 2H - pyran and 2,5 - dimethyl - 2 - hydroxyadipaldehyde and heating said mixture at a temperature of 80° C. to 180° C. to cause the formation of 2,5-dimethylcyclopentanone.

8. A process which comprises forming a mixture of an aqueous solution of sulfuric acid of a minimum concentration of eight percent and 3,4 - dihydro - 2,5 - dimethyl - 2 - formyl - 2H - pyran and heating said mixture at a temperature of 110° C. to 125° C. to cause the formation of 2,5-dimethylcyclopentanone.

9. A process which comprises forming a mixture of an aqueous solution of sulfuric acid of a minimum concentration of eight percent and 2,5 - dimethyl - 2 - hydroxyadipaldehyde and heating said mixture at a temperature of 110° C. to 125° C. to cause the formation of 2,5-dimethylcyclopentanone.

10. A process which comprises forming a mixture of an aqueous solution of phosphoric acid of a minimum concentration of eight percent and 3,4 - dihydro - 2,5 - dimethyl - 2 - formyl - 2H - pyran and heating said mixture at a temperature of 110° C. to 125° C. to cause the formation of 2,5-dimethylcyclopentanone.

11. A process which comprises forming a mixture of an aqueous solution of phosphoric acid of a minimum concentration of eight percent and 2,5 - dimethyl - 2 - hydroxyadipaldehyde and heating said mixture at a temperature of 110° C. to 125° C. to cause the formation of 2,5-dimethylcyclopentanone.

12. A process which comprises forming a mixture of an aqueous solution of hydrochloric acid of a minimum concentration of eight percent and 3,4 - dihydro - 2,5 - dimethyl - 2 - formyl - 2H - pyran and heating said mixture at a temperature of 110° C. to 125° C. to cause the formation of 2,5-dimethylcyclopentanone.

13. A process which comprises forming a mixture of an aqueous solution of hydrochloric acid of a minimum concentration of eight percent and 2,5 - dimethyl - 2 - hydroxyadipaldehyde and heating said mixture at a temperature of 110° C. to 125° C. to cause the formation of 2,5-dimethylcyclopentanone.

References Cited in the file of this patent
UNITED STATES PATENTS
2,694,077    Stansbury, Jr. et al. _____ Nov. 9, 1954